United States Patent
Nadakuditi et al.

(10) Patent No.: US 11,620,083 B2
(45) Date of Patent: Apr. 4, 2023

(54) METHOD FOR IMPLEMENTING PREDICTABLE LATENCY MODE FEATURE IN SSD, AND NON-VOLATILE MEMORY (NVM) BASED STORAGE DEVICE

(71) Applicant: SAMSUNG ELECTRONICS CO., LTD., Suwon-si (KR)

(72) Inventors: Srinivasa Raju Nadakuditi, Bangalore (IN); Abhinav Kumar Singh, Bangalore (IN); Chandrashekar Tandavapura Jagadish, Bangalore (IN); Manu Yelakkuru Prabhuswamy, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/463,908

(22) Filed: Sep. 1, 2021

(65) Prior Publication Data

US 2023/0004323 A1    Jan. 5, 2023

(30) Foreign Application Priority Data

Jul. 2, 2021   (IN) .............................. 202141029863

(51) Int. Cl.
*G06F 3/06*   (2006.01)

(52) U.S. Cl.
CPC ............ *G06F 3/0659* (2013.01); *G06F 3/064* (2013.01); *G06F 3/0613* (2013.01); *G06F 3/0631* (2013.01); *G06F 3/0665* (2013.01); *G06F 3/0679* (2013.01)

(58) Field of Classification Search
CPC ...... G06F 3/0613; G06F 3/0631; G06F 3/064; G06F 3/0659; G06F 3/0665; G06F 3/0679

See application file for complete search history.

(56) References Cited

U.S. PATENT DOCUMENTS

| | | | |
|---|---|---|---|
| 2015/0254088 A1* | 9/2015 | Chou | G06F 3/0664 718/1 |
| 2018/0089101 A1 | 3/2018 | Sternberg et al. | |
| 2019/0042413 A1* | 2/2019 | Wysocki | G06F 11/1076 |
| 2019/0050161 A1* | 2/2019 | Wysocki | G06F 13/1673 |

(Continued)

FOREIGN PATENT DOCUMENTS

CN    105892955 A    8/2016

*Primary Examiner* — Larry T Mackall
(74) *Attorney, Agent, or Firm* — Lee IP Law, P.C.

(57) ABSTRACT

A method includes: receiving, by a storage device from a core in a host, a request to provide exclusive resource to a command of a predefined submission queue of a non-volatile memory (NVM) set in the storage device, wherein the request pertains to operating the NVM set in a deterministic state; generating a virtual NVM set identifier for a virtual NVM set based on a predefined mapping of the predefined submission queue and the NVM set; determining a storage controller associated with the NVM set based on a predefined mapping of the predefined submission queue, the NVM set, and the virtual NVM set identifier; enabling at least one core to operate in a Predictable Latency Mode; and operating the storage controller and the NVM set in the deterministic state by allocating predetermined resources to execute the command and return data with a predictable latency.

9 Claims, 6 Drawing Sheets

(56) References Cited

U.S. PATENT DOCUMENTS

| | | | |
|---|---|---|---|
| 2019/0146708 A1* | 5/2019 | Casmira | G06F 3/064 |
| | | | 711/103 |
| 2019/0378589 A1* | 12/2019 | Perlmutter | G11C 29/52 |
| 2020/0225874 A1 | 7/2020 | Nimmagadda et al. | |
| 2020/0409874 A1* | 12/2020 | Moss | G06F 11/0703 |

* cited by examiner

METHOD FOR IMPLEMENTING PREDICTABLE LATENCY MODE FEATURE IN SSD, AND NON-VOLATILE MEMORY (NVM) BASED STORAGE DEVICE

CROSS-REFERENCE TO RELATED APPLICATION

Indian Patent Application No. 202141029863, filed on Jul. 2, 2021, in the Indian Intellectual Property Office, and entitled: "METHOD FOR IMPLEMENTING PREDICTABLE LATENCY MODE FEATURE IN SSD," is incorporated by reference herein in its entirety.

BACKGROUND

1. Field

Embodiments relate to non-volatile memory based devices.

2. Description of the Related Art

Virtualization is an emerging technology for sharing of the resources. In virtualization technology, for instance, in a bare metal NVM Express (NVMe) controller-based solid state drive (SSD), the different layers of the Host to device interface in a device may support Single Root I/O Virtualization (SR-IOV). In virtualization, SR-IOV is a specification that allows the isolation of PCI Express (PCIe) resources for manageability and performance reasons.

SUMMARY

Embodiments are directed to a method, including: receiving, by a storage device from a core in a host supporting one or more cores, a request to provide exclusive resource to a command belonging to one or more predefined submission queues of a non-volatile memory (NVM) set in the storage device, wherein the request pertains to operating the NVM set in a deterministic state to return data with a predictable latency; generating a virtual NVM set identifier for a virtual NVM set based on a predefined mapping of the one or more predefined submission queues and the NVM set; determining a storage controller associated with the NVM set based on a predefined mapping of the one or more predefined submission queues, the NVM set, and the virtual NVM set identifier; enabling at least one core of the host to operate in a Predictable Latency Mode; and operating the storage controller and the NVM set in the deterministic state by allocating predetermined resources to execute the command and return data with a predictable latency.

Embodiments are also directed to a storage device, including: a receiver configured to receive, from a core in a host device supporting multiple cores, a request to provide exclusive resource to a command belonging to one or more predefined submission queues of a non-volatile memory (NVM) set, wherein the request pertains to operating the NVM set in a deterministic state to return data with a predictable latency; a processing module configured to: generate a virtual NVM set identifier for a virtual NVM set based on a predefined mapping of the one or more predefined submission queues and the NVM set, determine a storage controller associated with the NVM set based on a predefined mapping of the one or more predefined submission queues, the NVM set, and the virtual NVM set identifier, and enable at least one of the multiple cores of the host to operate in a Predictable Latency Mode; and a storage controller driving module configured to operate the determined storage controller and the NVM set in the deterministic state by allocating predetermined resources to execute the command and return data with a predictable latency.

BRIEF DESCRIPTION OF FIGURES

Features will become apparent to those of skill in the art by describing in detail example embodiments with reference to the attached drawings in which.

DETAILED DESCRIPTION

Example embodiments relate to implementing a Predictable Latency Mode (PLM) feature in a Non-Volatile Memory Express® (NVMe)-based solid state drive (SSD) device supporting single root I/O virtualization. The NVMe is a host controller interface and storage protocol created to accelerate the transfer of data between enterprise and client systems and solid state drives over a computer's high-speed Peripheral Component Interconnect Express (PCIe) bus. Example embodiments may use a virtual NVM set (VNVM set) concept, through which a controller gives priority in fetching more information, as for instance commands, from controller(s) that are in Predictable Latency Mode.

In an example embodiment, there is provided a method that uses a virtual NVM set concept to uniquely identify controllers that are in Predictable Latency Mode. The VNVM set is derived based at least on a namespace identifier (NS ID), the NVM set, and a Controller ID. A NVMe namespace is a measure of non-volatile memory (NVM) that may be configured into logical blocks. The NVMe namespace may be used when a storage virtual machine is configured with the NVMe protocol. The VNVM sets may be derived while creating the NVMe namespace.

When a "CREATE IOSQ" is encountered with at least a hint related to an NVM set, then its virtual NVM (VNVM) set is associated with a queue. The VNVM set changes based on Controller ID or NVM set. A table or log is used to uniquely select the VNVM set that is in Predictable Latency Mode. Additional commands may be fetched into the device, for an NVM set that is in deterministic window. Further, the dynamic allocation of the controller resources is performed, for which more priority is needed.

Figure 4:
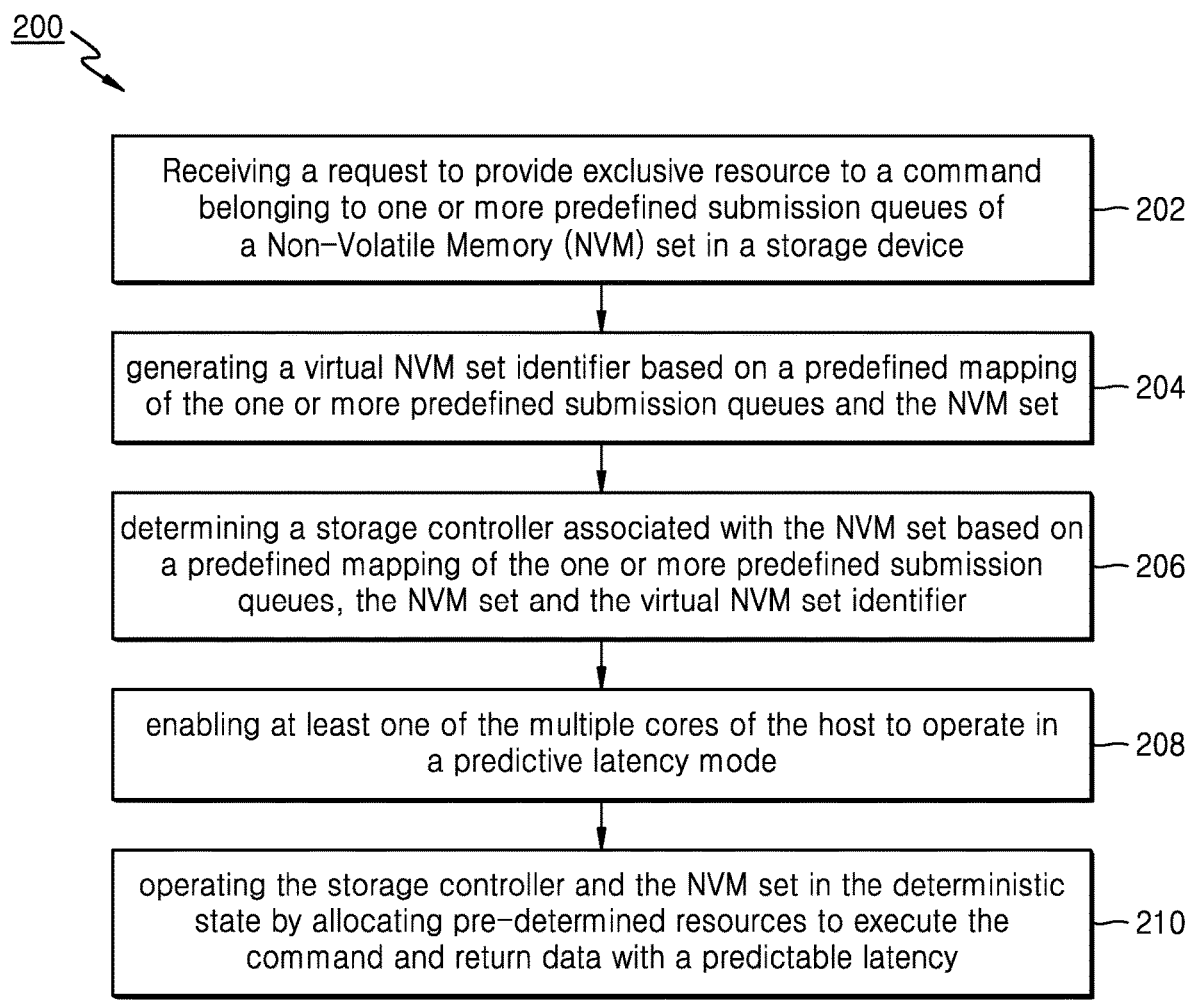
FIG. 4 illustrates a control-flow for providing predictable latency for a storage device, in accordance with an example embodiment.

FIG. 4 illustrates control flow 200 for providing predictable latency for a storage device, in accordance with an example embodiment.

In an example embodiment, there is provided a method to provide predictable latency for a storage device, the method including receiving (202), from a core in a host supporting multiple cores, a request to provide exclusive resource to a command belonging to one or more predefined submission queues of a NVM set in a storage device, wherein the request pertains to operating the NVM set in a deterministic state to return data with a predictable latency. In an example embodiment, the host may be a host in virtualization environment defined by SR-IOV.

The method further includes generating (204) a virtual NVM set identifier based on a predefined mapping of the one or more predefined submission queues and the NVM set. The NVM set includes a plurality of namespaces defining a collection of logical block address. The NVM set may optionally include an unallocated storage area defining a space outside the namespace and inaccessible to the host.

The method further includes determining (206) a storage controller associated with the NVM set based on a predefined mapping of the one or more predefined submission queues, the NVM set, and the virtual NVM set identifier. Further, each of the plurality of namespaces is uniquely mapped with a virtual NVM set identifier.

The method further includes enabling (208) at least one of the multiple cores of the host to operate in Predictable Latency Mode.

The method further includes operating (210) the storage controller and the NVM set in the deterministic state by allocating predetermined resources to execute the command and return data with a predictable latency. With respect to executing one or more commands of another virtual NVM set not undergoing the deterministic mode of operation, less resources may be allocated to the storage controller.

According to the present example embodiment, the operation of the storage controller and the NVM set in the deterministic state includes determining a namespace mapped with the virtual NVM set identifier and the storage controller, and allocating resources of the storage device to the namespace. The operation further includes fetching a plurality of commands from one or more associated submission queues based on the allocated resources. If the allocated storage controller is not compatible with a deterministic mode of operation, then the performance of the deterministic mode of operation includes executing the one or more commands belonging to the virtual NVM set based on augmenting resources of the storage controller for executing the command.

The operation further includes fetching one or more commands from each of the one or more associated submission queues based on a predefined sequence for a submission queue, a priority level associated with the submission queue, and an arbitration burst setting, and processing the one or more commands based on defined execution order in the storage controller.

With respect to the further storage controllers associated with the NVM set in a non-deterministic state, the method further includes fetching one or more commands from each submission queue in one or more remaining submission queues from a plurality of submission queues based on a predefined sequence for each submission queue, a priority level associated with each submission queue, and an arbitration burst setting, where the plurality of submission queues including the one or more predefined submission queues mapped to the NVM set. If the execution of the one or more commands is blocked due to the operation of the further NVM set in the non-deterministic state, a time period is estimated indicating the operation of the further NVM set in the non-deterministic state. The execution of the one or more blocked commands is controlled or held until expiry of the time period.

In an example embodiment, the following stages are included: a) prior configuration; and b) real time operation.

As a part of prior configuration, there may be two example stages: Stage 1 and Stage 2.

As a part of Stage 1 of the prior configuration, a VNVM set is derived based at least on namespace identifier (NS ID), a NVM set, and a controller ID. In an example embodiment, Table 1 illustrates VNVM SET ID derivation from inputs during NS creation:

TABLE 1

| Controller ID | NS ID | NVMSET ID | VNVMSET ID |
|---|---|---|---|
| 1 | 1 | 1 | 1 |
| 1 | 3 | 2 | 2 |
| 2 | 2 | 1 | 3 |
| 2 | 4 | 2 | 4 |

Stage 2 illustrates associating the VNVM set association of Table 1 with SQ ID during queue creation with respect to the NVM set as a part of generating following Table 2.

TABLE 2

| Controller ID | SQ.ID | NVMSET ID | VNVMSET ID |
|---|---|---|---|
| 1 | 1 | 1 | 1 |
| 1 | 2 | 1 | 1 |
| 1 | 3 | 2 | 2 |
| 1 | 4 | 2 | 2 |
| 2 | 1 | 1 | 3 |
| 2 | 2 | 1 | 3 |
| 2 | 3 | 2 | 4 |
| 2 | 4 | 2 | 4 |

Accordingly, Table 2 denotes a predefined mapping of the one or more predefined submission queues and the NVM.

As a part of real time operation, there may be following example steps of operation that correspond to FIG. 4:

Step 1: This step corresponds to steps 202 and 204. When the command "CREATE IO SQ" arrives from the host with a hint related to an NVM set, then a corresponding virtual NVM set ID is associated with that queue. The association of NVM set ID may be performed based on Table 2. In an example embodiment, an SQ ID 3 linked with NVM set 2 with respect to "CREATE IO SQ", the VNVM ID as determined may be "VNVM Set 4" based on Table 2.

Step 2: This step corresponds to step 206. The storage controller ID as determined with respect to the combination of VNVM Set 4 and SQ ID 3 is Controller 2 based on Table 2.

Step 3: This step corresponds to steps 208 and 210. Based on the combination of identified controller 2 and the VNVM Set 4, a corresponding namespace ID "NS 4" may be identified from Table 1. Accordingly, the storage controller 4 and the NVM set 2 are operated in the deterministic state by allocating predetermined resources of the storage device to NS 4 for executing the command and returning data with a predictable latency.

The operation further includes fetching the plurality of commands from the one or more predefined submission queues based on the allocated resources to the NS 4. If the allocated storage controller (i.e., controller 2) is not compatible with deterministic mode of operation, then the performance of deterministic mode of operation includes augmenting resources of the controller 2 for executing the command. Accordingly, with respect to executing the one or more commands of the same or another virtual NVM set not undergoing the deterministic mode of operation, less resources may be allocated to the storage controller (e.g., controller 1).

In an example embodiment, Table 3 illustrates example hardware (HW) resource allocation in accordance with the VNVM ID.

TABLE 3

| VNVM SET | HW Resources (TAG) |
|---|---|
| 1 | 202 |
| 2 | 18 |
| 3 | 18 |
| 4 | 18 |

Thus, I/O determinism quality of service (IOD QOS) may not be affected when a NVM set is shared by controllers. This may be extended to support a host-selected arbitration mechanism across controllers.

Figure 5:
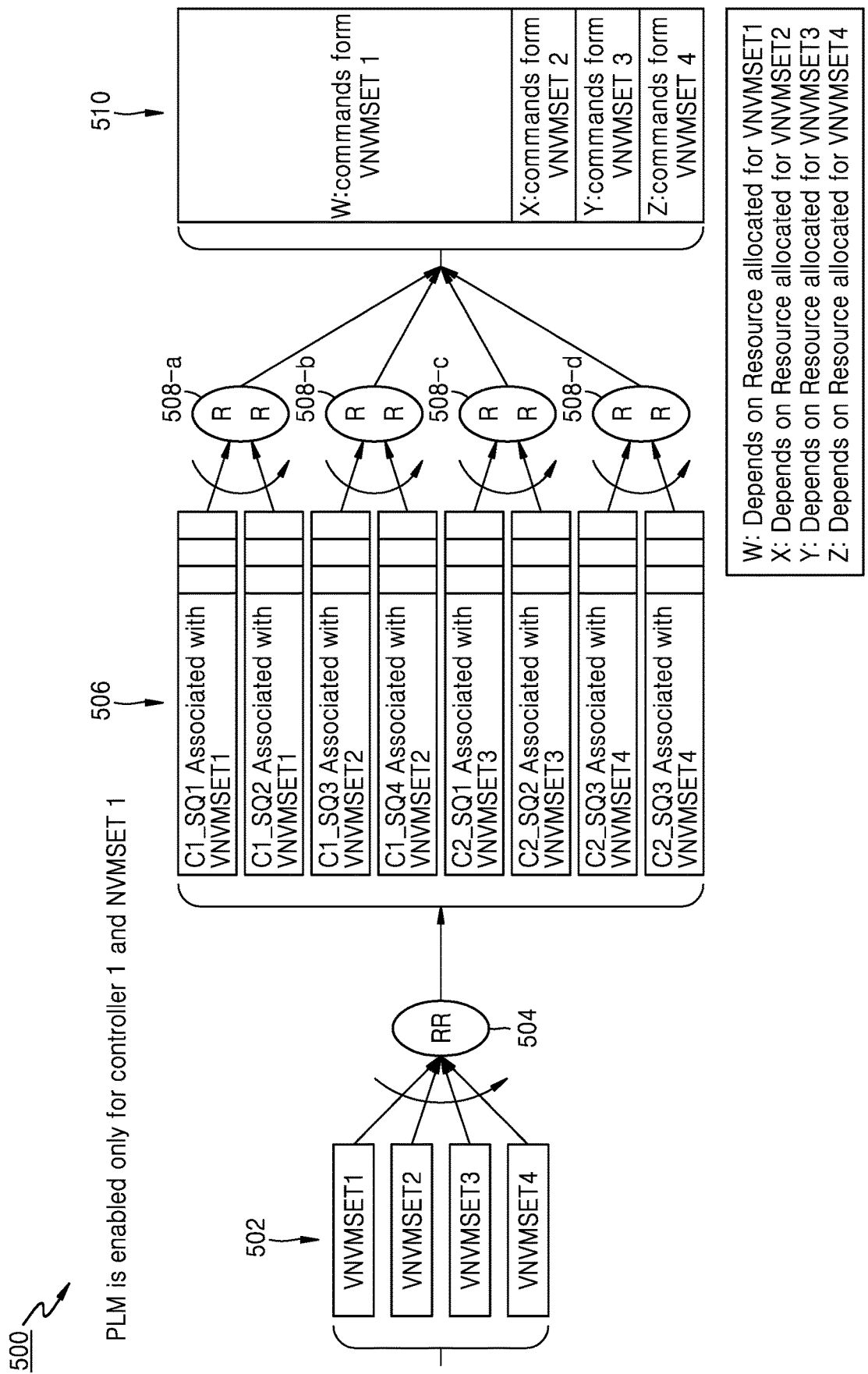
FIG. 5 illustrates an example arbitration mechanism when PLM is enabled for only one controller NVM set, in accordance with an example embodiment.

FIG. 5 illustrates an example arbitration mechanism 500 when PLM is enabled for only one controller NVM set.

FIG. 5 refers an example scenario wherein two controllers are present. As shown in FIG. 5, VNVMSET1 is set in PLM out of multiple virtual NVM sets. In such a scenario, the VNVMSET1 that is in PLM is awarded more processing resources, as compared to the other VNVM sets.

In operation, as depicted in FIG. 5, multiple VNVM sets (502) are present across the storage controllers. Out of those, VNVMSET1 is set in PLM. Further, round robin (RR) arbitration (504) executes among the VNVM sets, such that various submission queues (506) become associated with VNVM sets.

Further, round robin arbitration (508-a) among queues belonging to VNVMSET1 operates in accordance with PLM, and round robin arbitration (508-b to 508-d) operates among the queues belonging to VNVM sets that are not in PLM. Further, commands (510) are fetched from VNVMSET1 that is in PLM. Thus, more commands are fetched from the VNVMSET1 compared to other VNVM sets, because VNVMSET1 is in PLM.

Figure 6:
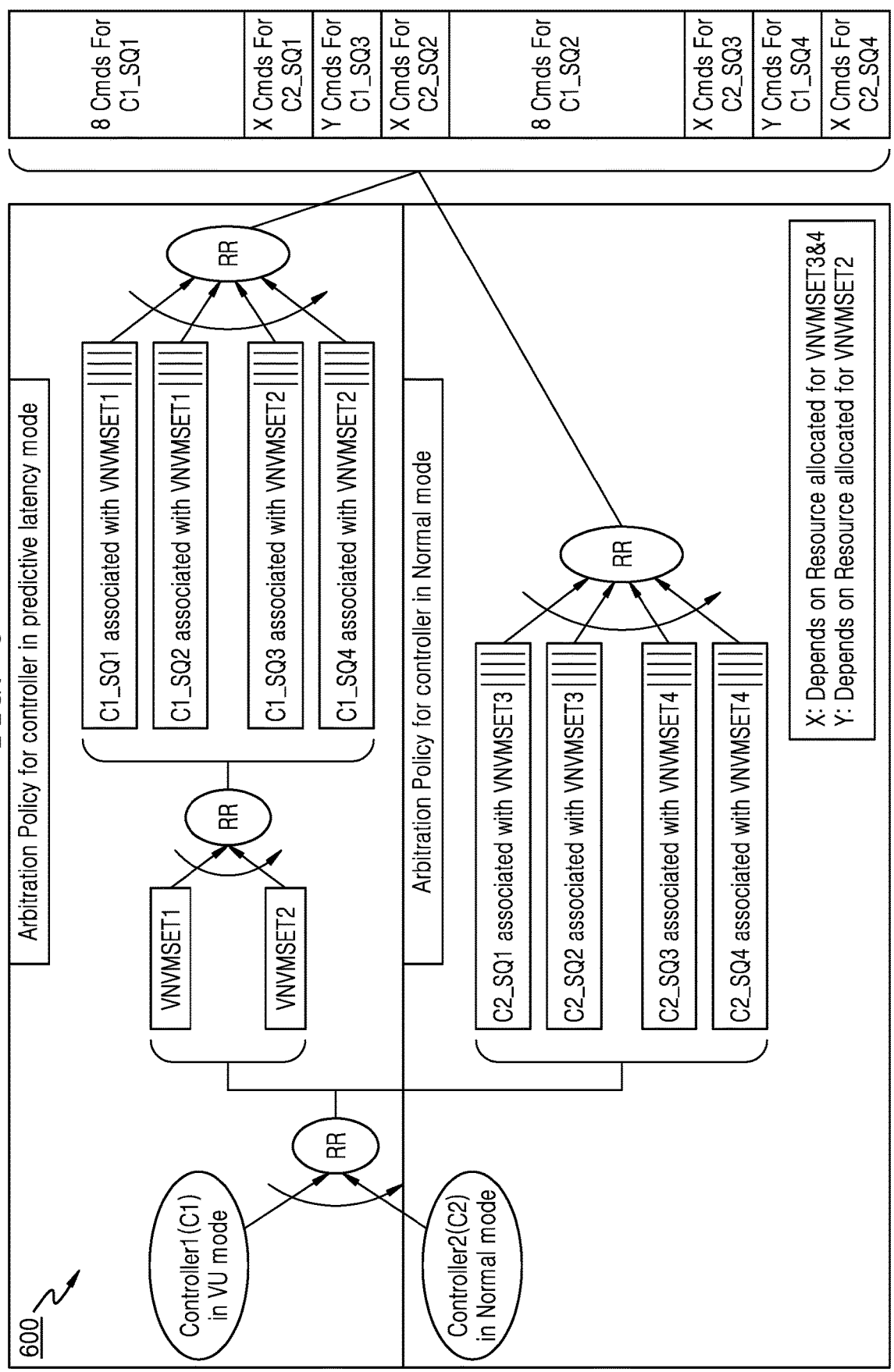
FIG. 6 illustrates arbitration policy for a controller in Predictable Latency Mode and normal mode, in accordance with an example embodiment.

FIG. 6 illustrates arbitration policy 600 for a controller in Predictable Latency Mode and normal mode, in accordance with an example embodiment.

FIG. 6 illustrates a scenario when multiple controllers are present, out of which one controller (controller C1) is incorporating the special arbitration policy to honor PLM, and another controller (controller C2) is incorporating normal round robin arbitration policy among the queues.

Overall, the controller C1 is associated with the special arbitration policy, and the controller C2 is associated with standard round robin arbitration policy. The controller C1 with special arbitration policy arbitrates among the VNVM sets, whereas the controller C2 with round robin arbitration policy arbitrates among the queues. More commands are fetched through the controller C1 as compared to the controller C2, as the controller C1 is in PLM.

Thus, the IOD QOS may not be affected when a NVM set is shared by controllers. This may be extended to support a host-selected arbitration mechanism across controllers.

By way of summation and review, non-volatile memory (NVM) (e.g., NAND flash memory) may be implemented in numerous physical form factors, including solid state drives (SSDs), peripheral component interconnect express (PCI Express, PCIe) add-in cards, M.2 memory cards, and other forms. NVM Express (NVMe), as a logical device interface, is designed to capitalize on the low latency and internal parallelism of solid state storage devices. A collection of non-volatile memories, referred as a NVM set, may be separated (logically and potentially physically) from NVM of other NVM Sets. A single NVM set may wholly contain a namespace, and may not span more than one NVM Set. Further, within an NVM set, multiple namespaces may be present that can be attached to different controllers, or a single namespace can be shared to different controller.

Figure 1:
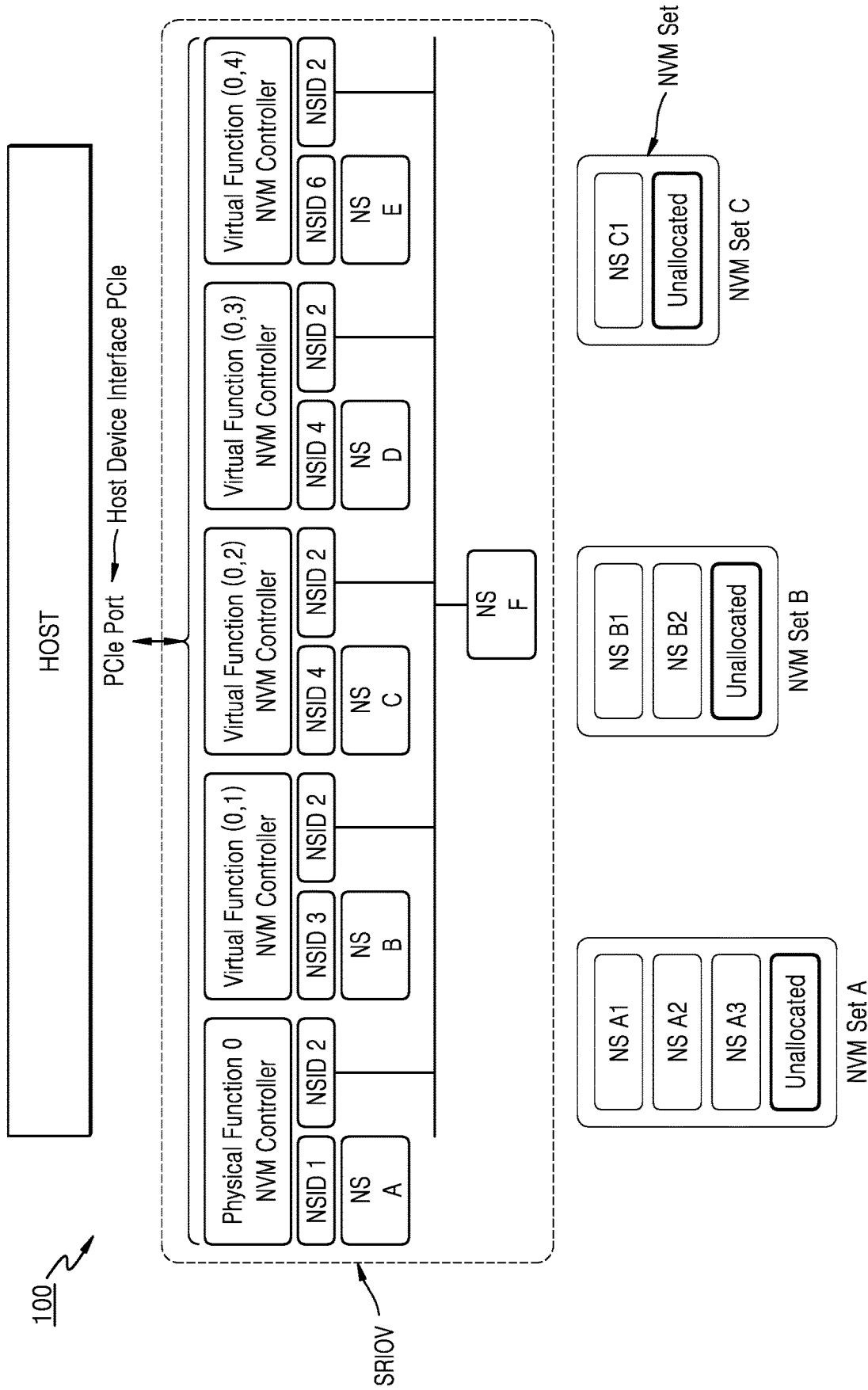
FIG. 1 illustrates general host-device interface supporting Single Root I/O Virtualization (SR-IOV)
Figure 2:
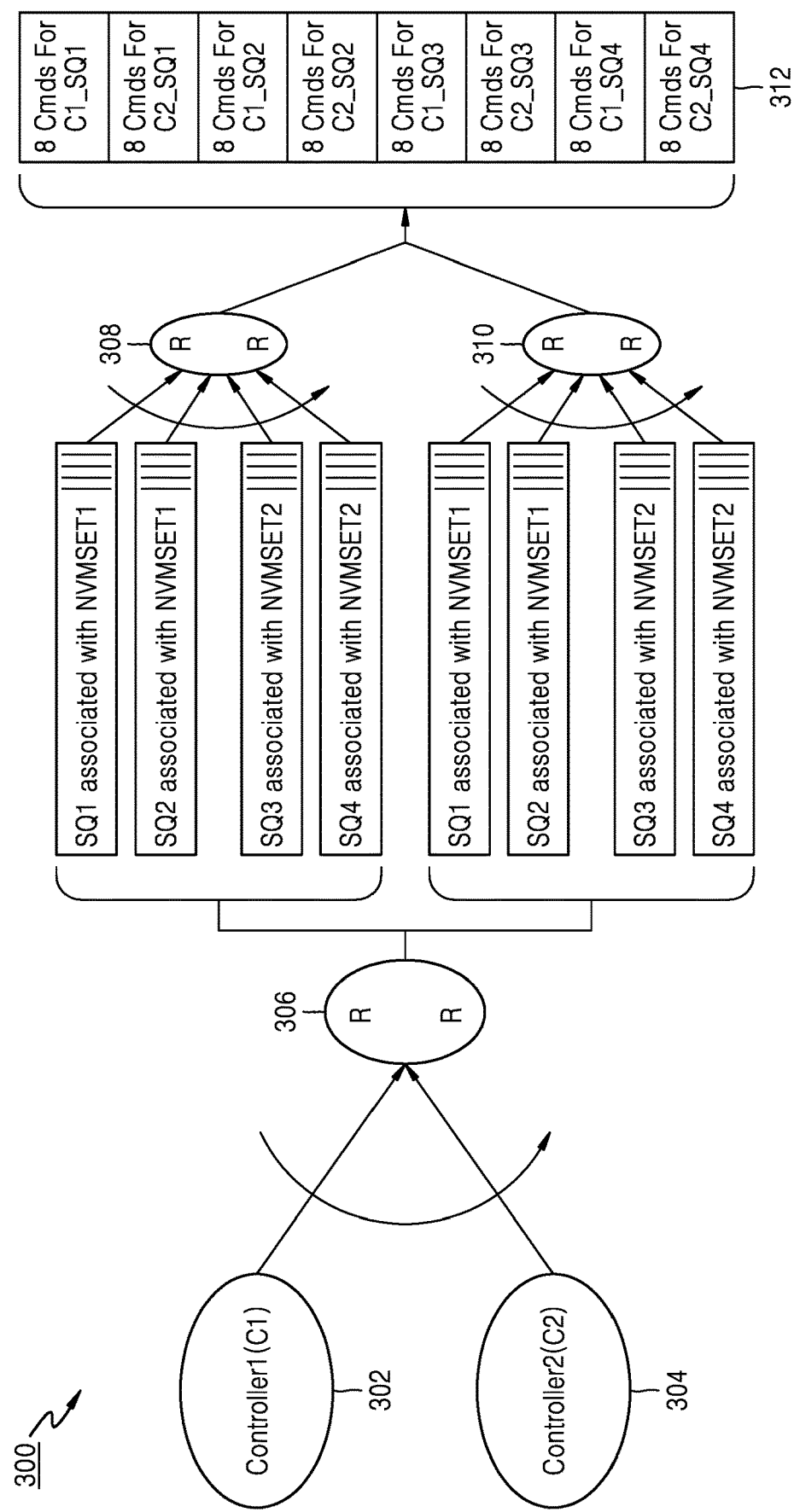
FIG. 2 illustrates an arbitration policy when PLM is enabled for a single controller NVM set.
Figure 3:
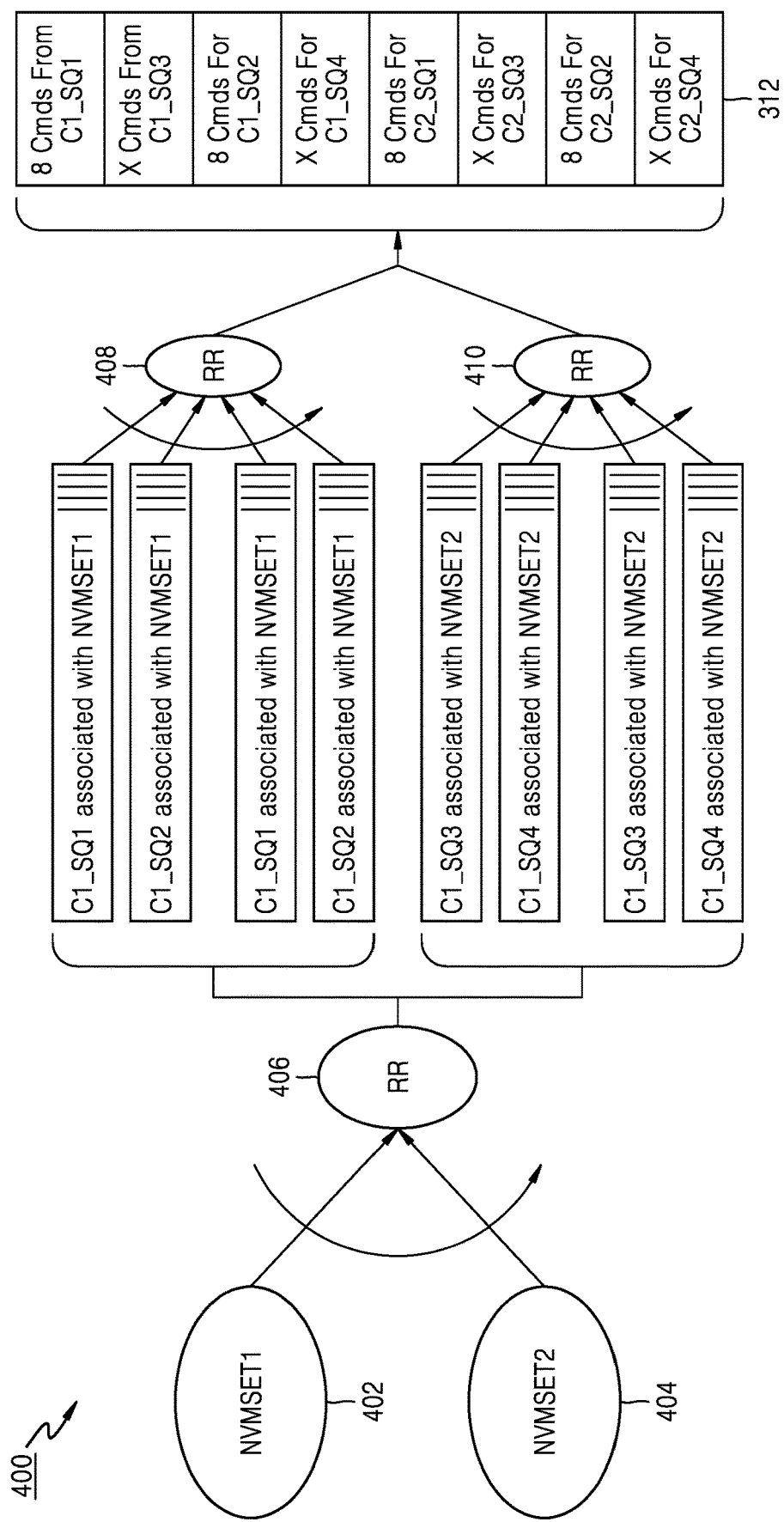
FIG. 3 illustrates another arbitration policy when PLM is enabled for only one controller NVM set.

FIG. 1 illustrates general host-device interface 100 supporting Single Root I/O Virtualization (SR-IOV). FIG. 2 illustrates an arbitration policy 300 when PLM is enabled for a single controller NVM set. FIG. 3 illustrates another arbitration policy 400 when PLM is enabled for only one controller NVM set.

As depicted in FIG. 1, a PCIe-based NVM controller supporting Predictable Latency Mode (PLM) may be expected to honor an agreed Quality of Service (QOS) on the NVM sets and their associated namespaces. When PLM is enabled, the I/O information that access NVM in the same NVM set have the same/deterministic QOS attributes. The I/O information that access NVM in one NVM set do not impact the QOS of I/O information that access NVM in a different NVM set. However, in a Single Root I/O Virtualization (SR-IOV) environment, where two or more initiators may be present, I/O's can be triggered independently to the same NVM set. Further, based on the requirement of host applications, a predictable latency window may be enabled independently by one host, whereas another host can be in non-predictive mode.

In general, it may not be possible to honor the Predictable Latency Mode (PLM) feature from the moment information is submitted to the device. If a general arbitration mechanism such as round robin (RR) or weighted round robin (WRR) is followed in the manner depicted in FIG. 2, the device may not be able to honor the PLM feature.

In a general arbitration mechanism, it may not be efficient to honor the PLM feature under all circumstances or loads. For instance, as depicted in FIG. 3, if multiple controllers are submitting information to the same NVM set, then the PLM feature may not be honored efficiently.

As described above, embodiments relate to computing environment for a PCIe interface-based non-volatile memory (NVM) host controller for solid state drives supporting Single Root I/O Virtualization (SR-IOV). Embodiments may provide a method to honor predictable latency for a storage device. The method may include receiving, from a core in a host supporting multiple cores, a request to provide exclusive resource to a command belonging to one or more predefined submission queues of a NVM set in a storage device, wherein the request pertains to operating the NVM set in a deterministic state to return data with a predictable latency. The method may further include generating a virtual NVM set identifier based on a predefined mapping of the one or more predefined submission queues and the NVM set. The method may further include determining a storage controller associated with the NVM set based on a predefined mapping of the one or more predefined submission queues, the NVM set, and the virtual NVM set identifier. The method may further include enabling at least one of the multiple cores of the host to operate in a Predictable Latency Mode (PLM). The method may further include operating the storage controller and the NVM set in the deterministic state by allocating predetermined resources to execute the command and return data with a predictable latency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method, comprising:
   receiving, by a storage device from a core in a host supporting one or more cores, a request to provide exclusive resource to a command belonging to one or more predefined submission queues of a non-volatile memory (NVM) set in the storage device, wherein the request pertains to operating the NVM set in a deterministic state to return data with a predictable latency;
   generating a virtual NVM set identifier for a virtual NVM set based on a predefined mapping of the one or more predefined submission queues and the NVM set;
   determining a storage controller associated with the NVM set based on a predefined mapping of the one or more predefined submission queues, the NVM set, and the virtual NVM set identifier;
   enabling at least one core of the host to operate in a Predictable Latency Mode; and
   operating the storage controller and the NVM set in the deterministic state by allocating predetermined resources to execute the command and return data with a predictable latency.

2. The method as claimed in claim 1, wherein the NVM set includes:
   a plurality of namespaces defining a collection of logical block address; and
   optionally, an unallocated storage area defining a space outside the plurality of namespaces and inaccessible to the host.

3. The method as claimed in claim 2, wherein each of the plurality of namespaces is uniquely mapped with a virtual NVM set identifier.

4. The method as claimed in claim 2, wherein operating the storage controller and the NVM set in the deterministic state includes:
   determining a namespace mapped with the virtual NVM set identifier and the storage controller;
   allocating resources of the storage device to the determined namespace; and
   fetching a plurality of commands from the one or more predefined submission queues based on the allocated resources.

5. The method as claimed in claim 4, further comprising:
   fetching one or more commands from each of the one or more predefined submission queues based on a predefined sequence for a selected submission queue, a priority level associated with the selected submission queue, and an arbitration burst setting; and
   processing the one or more commands based on a defined execution order in the storage controller.

6. The method as claimed in claim 1, further comprising:
   operating another storage controller associated with the NVM set in a non-deterministic state; and
   operating another NVM set in the storage device in a non-deterministic state.

7. The method as claimed in claim 6, further comprising:
   fetching one or more commands from each submission queue in one or more remaining submissions queues from a plurality of submission queues based on a predefined sequence for each submission queue, a priority level associated with each submission queue, and an arbitration burst setting, the plurality of submission queues including the one or more predefined submission queues mapped to the NVM set;
   determining whether execution of the one or more commands is blocked due to the operation of the other NVM set in the non-deterministic state;
   estimating a time period that indicates whether the other NVM set operates in the non-deterministic state; and
   controlling execution of the one or more commands until expiry of the time period.

8. The method as claimed in claim 1, wherein the operating of the NVM set in the deterministic state includes executing one or more commands belonging to the virtual NVM set based on allocating more resources of the determined storage controller.

9. The method as claimed in claim 1, further comprising executing one or more commands of another virtual NVM set that is not operating in the deterministic state based on allocating less resources of the determined storage controller.

* * * * *